March 7, 1950  W. M. MASON  2,499,519
WHEEL CLEANER FOR ROW CROP TRACTORS
Filed June 22, 1946  2 Sheets-Sheet 1
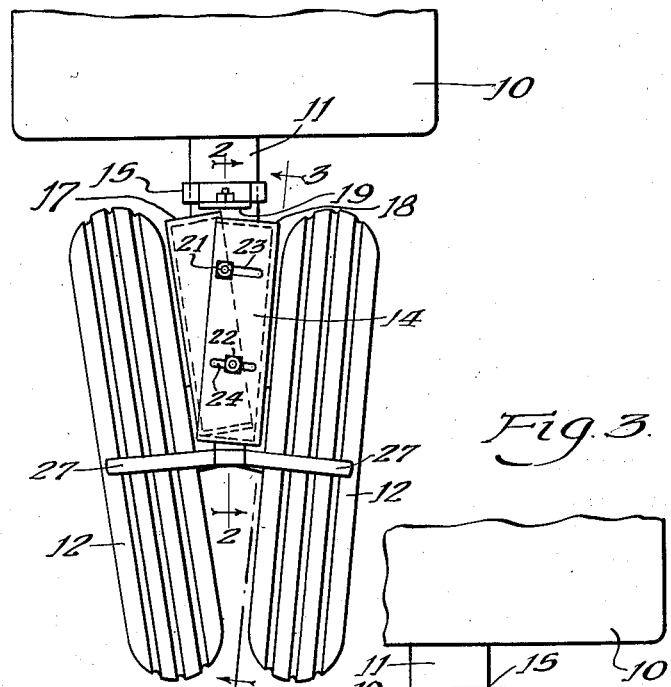
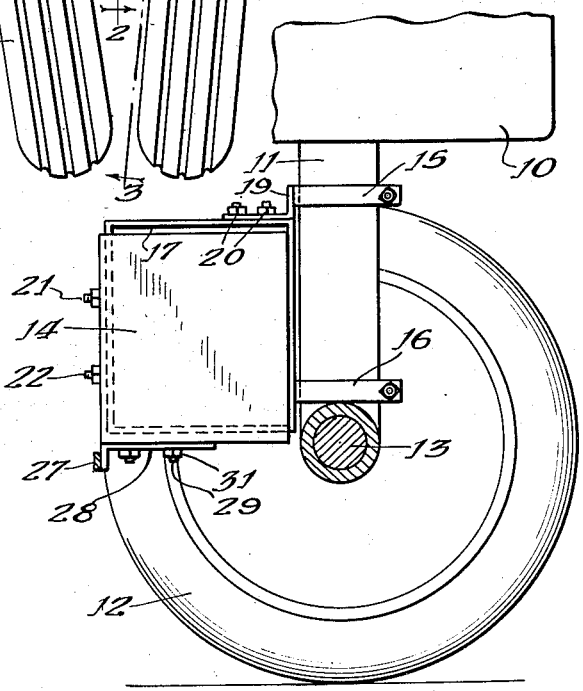
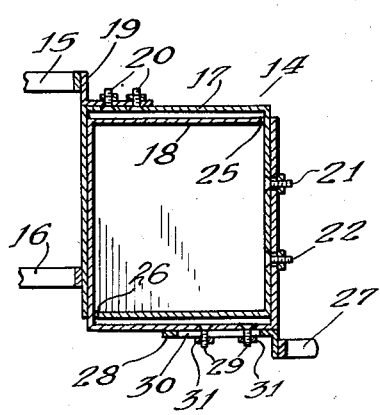
Inventor:
Walter M. Mason
By Greek Wells
Attorney March 7, 1950 W. M. MASON 2,499,519
WHEEL CLEANER FOR ROW CROP TRACTORS Filed June 22, 1946 2 Sheets-Sheet 2

Inventor:
Walter M. Mason
By Greek Wells
Attorney

Patented Mar. 7, 1950

2,499,519

UNITED STATES PATENT OFFICE 2,499,519

WHEEL CLEANER FOR ROW CROP TRACTORS

Walter M. Mason, Woodstock, Ill.

Application June 22, 1946, Serial No. 678,669

3 Claims. (Cl. 280—158)

The present invention relates to wheel cleaners that are particularly adapted to cleaning the mud off the steering wheels of row crop cultivator tractors. These small tractors very often have two front wheels that are placed quite close to each other. In certain tractors these steering wheels are not parallel. They are generally tilted to the vertical so as to be closer together at the ground than at the tops thereof. In other tractors the wheels are parallel. The wheels support a steering column by which they may be turned. In muddy soil these wheels tend to pick up mud and pack it in between them until they slide and prevent steering of the tractor.

It is the purpose of my invention to provide a simple means that can be attached to the steering column for preventing such accumulation of mud between the wheels. I have found that the device must not only scrape the wheels, but must also provide a blockade to prevent mud from being carried upward between the wheels, and to prevent mud thrown upward by the wheels from packing between them against the steering and supporting column. My invention contemplates a device wherein a horizontal portion at about axle level keeps the mud from being carried up between the wheels while an upper portion keeps the mud that may be thrown upward by the wheels from lodging between them.

The nature and advantages of my invention will appear more fully from the following description and the accompanying drawings wherein a preferred form of the invention is shown. It should be understood, however, that the drawings and description are illustrative only, and should not be taken as limiting the invention except insofar as it is limited by the claims.

In the drawings:

Figure 1 is an end view looking lengthwise of the tractor showing my device mounted in operative position between the steering wheels;

Figure 2 is a sectional view on the line 2—2 of Figure 1 through the wheel cleaning device;

Figure 3 is a sectional view on the line 3—3 of Figure 1;

Figure 4:
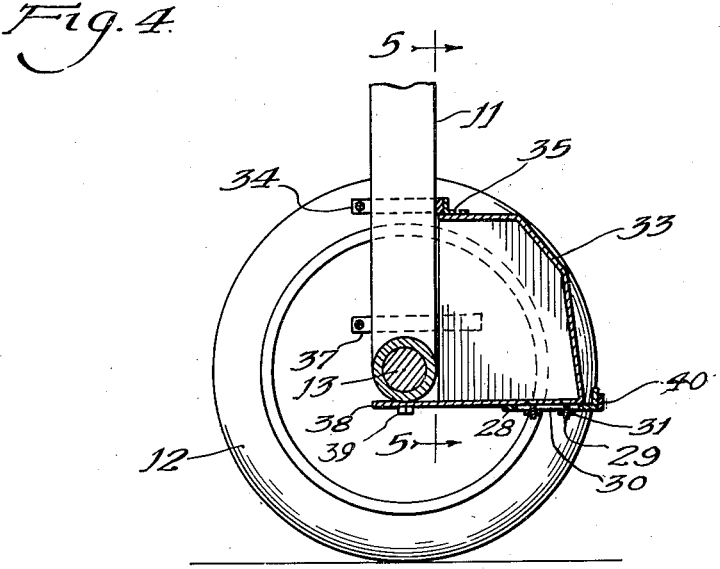
Figure 4 is a sectional view similar to Figure 3 showing a simplified device that is suitable for the wheels when they are parallel.

Referring now to the drawings, my invention is intended to be applied to the steering wheels of row crop tractors. It is not limited to this particular application, however, and may be used wherever a wheel cleaning problem of like nature exists. The tractor body is indicated at 10. The steering column 11 extends down from the body and is supported by two wheels 12—12 and their axle 13. Figure 1 shows the wheels 12—12 tilted to the vertical in a well known manner.

My device comprises a casing 14 which is secured to the column 11 by an upper clamp 15 and a lower clamp 16. The casing, in order to be adjustable to fit varying angles of wheels to the vertical comprises two telescoping members 17 and 18. The member 17 carries the clamps 15 and 16, and the member 18 is adjustably secured to the member 17, so that these two members may be spread apart more or less and tilted with respect to each other to take care of varying spacing and angularity of wheels.

The upper clamp 15 is secured to the member 17 by a bracket 19 that is mounted by studs 20 on the member 17. The clamp 16 is welded directly to the member 17. In order to secure the two members 17 and 18 together screw threaded studs 21 and 22 are mounted on the member 17, and elongated slots 23 and 24 are provided in the member 18 to receive the studs. The parts are clamped by nuts applied to the studs 21 and 22. Also the upper wall of the member 18 is slotted as shown at 25 to allow the vertical wall of the member 17 to pass. In a like manner the bottom wall of the member 17 is slotted at 26 to allow the vertical wall of the member 18 to pass. By providing this manner of telescoping the parts, they are adequately secured by the studs 21 and 22, and the nuts thereon. Also the clamps are then carried by the member 17 and the bracket 19 is transversely slotted to receive the screw studs 20 so that the member 17 can be tilted to the vertical or mounted vertically as desired.

The member 18 carries a scraper 27 for engaging the tires. This scraper is mounted by a bracket 28 which is secured to the member 18 by two studs 29 extending through an elongated slot 30 in the bracket, and provided with nuts 31. The studs are welded or otherwise affixed to the bottom wall of the member 18.

Figure 5:
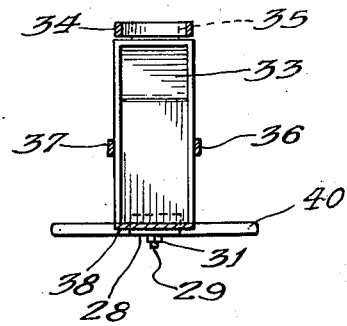
Figure 5 is a sectional view on the line 5—5 of Figure 4, with the wheels and column left out to better illustrate the cleaner.

In the simplified form of wheel cleaner shown in Figures 4 and 5, the casing is a one piece hollow shell 33 open on the side toward the steering column 11. The shell has a top clamp 34 mounted by a bracket 35 that may be welded direct to the shell. A second clamp is provided by two clamp arms 36 and 37 welded to the side of the shell 33. The shell has its bottom wall extended as shown at 38 so that a screw 39 may be used to fasten the shell below the axle of the wheels. This form of the invention also has a tire scraper 40 mounted on the bottom wall of the shell in essentially the same way that the scraper 27 is mounted.

It is believed that the nature and advantages of my invention will be clear from the foregoing description.

Having thus described my invention, I claim:

1. A wheel cleaning device for the purpose described comprising a hollow flat sided casing having means at one vertical edge for mounting on a steering and support column between two closely spaced wheels, said casing having closed bottom edge, front edge and top edge walls whereby to block mud away from the space between said wheels, said casing comprising two telescoping pan like sections adjustable toward and away from each other and having a limited angular adjustment with respect to each other.

2. A wheel cleaning device for the purpose described comprising a hollow flat sided casing having means at one vertical edge for mounting on a steering and support column between two closely spaced wheels, said casing having closed bottom edge, front edge and top edge walls whereby to block mud away from the space between said wheels, said casing comprising two opposed substantially rectangular pan shaped sections having their side walls interfitting.

3. A wheel cleaning device for the purpose described comprising a hollow flat sided casing having means at one vertical edge for mounting on a steering and support column between two closely spaced wheels, said casing having closed bottom edge, front edge and top edge walls whereby to block mud away from the space between said wheels, said casing comprising two opposed substantially rectangular pan shaped sections having their side walls interfitting, one of said sections carrying clamping rings comprising said mounting means.

WALTER M. MASON.

REFERENCES CITED

The following references are of record in the file of this patent:

UNITED STATES PATENTS

| Number | Name | Date |
|---|---|---|
| 1,196,897 | Stock | Sept. 5, 1916 |
| 1,259,865 | Hill | Mar. 19, 1918 |
| 1,829,172 | Walters | Oct. 27, 1931 |
| 1,936,701 | Wilson | Nov. 28, 1933 |
| 2,157,253 | Yetter | May 9, 1939 |
| 2,356,292 | Wildman | Aug. 22, 1944 |